United States Patent
Bachman et al.

(10) Patent No.: US 8,341,039 B2
(45) Date of Patent: Dec. 25, 2012

(54) MIXED SOURCE MEDIA PLAYBACK

(75) Inventors: William Martin Bachman, San Jose, CA (US); Christopher J. Sanders, San Jose, CA (US); Timothy B. Martin, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/249,074

(22) Filed: Sep. 29, 2011

(65) Prior Publication Data

US 2012/0022967 A1    Jan. 26, 2012

Related U.S. Application Data

(63) Continuation of application No. 12/642,700, filed on Dec. 18, 2009.

(51) Int. Cl.
*G06Q 30/00* (2006.01)
*G06F 3/00* (2006.01)

(52) U.S. Cl. ..................... 705/27.1; 715/704

(58) Field of Classification Search .............. 705/26–27; 715/704
See application file for complete search history.

(56) References Cited

U.S. PATENT DOCUMENTS

| | | | |
|---|---|---|---|
| 2002/0138630 A1* | 9/2002 | Solomon et al. | 709/228 |
| 2004/0019497 A1 | 1/2004 | Volk et al. | |
| 2006/0265421 A1* | 11/2006 | Ranasinghe et al. | 707/104.1 |
| 2008/0033979 A1* | 2/2008 | Vignoli et al. | 707/102 |
| 2009/0063975 A1 | 3/2009 | Bull et al. | |
| 2009/0239573 A1 | 9/2009 | Kretz et al. | |
| 2009/0307073 A1* | 12/2009 | MirrokniBanadaki et al. | 705/14.25 |

OTHER PUBLICATIONS

Naughton, J., "Business and Media: The Networker:Maddening Thing is that Record Firms Could Have Done it" (The Observer, London, May 4, 2003, p. 7).*

* cited by examiner

*Primary Examiner* — Jeffrey A Smith
*Assistant Examiner* — Ethan D Civan
(74) *Attorney, Agent, or Firm* — Schwegman Lundberg & Woessner, P.A.

(57) ABSTRACT

Playlists having media items from more than one source are described. Media items in a first library are mapped to media items from an online media item store. Media items within the playlist that can be found in the first library will be played from the first library, while media items not within the first library will be played from the online media store. By identifying media items present in both libraries and playing them only from the first library, the described method can reduce the royalties needing to be paid by the online media store. Further methods are disclosed for setting limits on the number of media items that can be shared by a second library.

18 Claims, 4 Drawing Sheets

MIXED SOURCE MEDIA PLAYBACK

CROSS-REFERENCE TO RELATED APPLICATIONS

This application is a continuation of U.S. patent application Ser. No. 12/642,700, filed on Dec. 18, 2009, which is incorporated by reference in its entirety, for all purposes, herein.

FIELD

The following relates to playlists of media and more specifically playlists having media items derived from multiple sources.

BACKGROUND

Aiding consumers in their discovery of new media is highly desirable to many consumers as well as content providers. Currently, the primary mechanisms for discovery of media items are (1) recommendation services, and (2) broadcasting (radio, commercials, and movie trailers). Each of these mechanisms can be inadequate.

Recommendation services frequently suggest media items to a consumer based on other media items that other consumers have browsed, sampled, or purchased along with browsing, sampling, or purchasing other items. For example, a user might be listening to a song in an online store or on a media playback program; an associated system informs the user of other items that the store considers similar based on an analysis of other users' actions. While this type of system is beneficial, in that it can recommend new media items based on media items that the user might know they already enjoy, it suffers from the drawback that the sampling of the media item is limited. Frequently, the user cannot listen or watch the entire media item to decide if they want to purchase the media item.

Broadcasting methods can allow a user to experience a substantial portion of a media item and better aid a consumer to make informed purchasing decisions. This is especially true with respect to audio items, which are frequently played in their entirety by radio stations. However, radio stations rarely select songs for a specific user making much of their content poorly suited for a given consumer. Additionally, broadcast mediums frequently play many items that are already owned by certain consumers and continue to repeat the same items, thus failing to educate the consumer.

Internet radio has attempted to find a balance, but it is not adequate. In many instances, Internet radio allows users to select a seed item and the Internet radio station can compile a playlist based on the seed item. However, Internet radio stations struggle to remain profitable because they must pay a royalty on a per song basis. Some internet radio and satellite radio providers charge subscription fees, but this too is undesirable because the fees limit the number of consumers that can be enticed to purchase the new media items that can be discovered by these subscription services.

Accordingly, a system is needed that can introduce consumers to new media items that are tailored to the consumer's taste, yet give the consumer the ability to experience a sufficient portion of the media item so that they can make an informed purchase decision and also limit the royalty exposure of the service aiding the user in the discovery of new media items without charging a fee.

SUMMARY

The following relates to creating playlists having media items derived from multiple sources, wherein one of the sources supplies media items that are not stored on the same device as the media player playing the playlist. In some embodiments, the user does not own or possess title to or have more than limited privileges to use or listen to the media items from a second source under the U.S. intellectual property laws.

In some embodiments the system includes an online store (such as ITUNES STORE, Apple Inc., Cupertino, Calif.), which keeps a record of the media items in a user's media library, regardless of the original source or point of purchase of the media items and supplies media items that are not stored in a user's local library for inclusion in the playlist. A user can create a playlist from which the system can choose one or more seed tracks which the user does not possess in his/her local library and include these tracks into the playlist. Alternatively, a user can create a playlist using a playlist algorithm which can create playlists based on one or more seed tracks by selecting songs that are relatively similar to the seed tracks. A user can also load a playlist created by an online store (such as ITUNES ESSENTIALS, Apple Inc., Cupertino, Calif.) or a friend or some other source. Regardless of how the playlist is generated, the media player can play media items that are located on a local disk from the local disk and download and play other media items from a remote source.

When the second source of media items is an online store, the online store will likely need to pay a royalty for each media item it shares with the user. In such embodiments, the system can limit the number of media items shared with users so that the program remains profitable. Further, the system can adjust the number of media items shared with specific users based on the program's success at driving purchases of new media items by that user.

The user can also adjust the amount of media items that are included in the playlist from outside their library according to their listening preferences.

In some embodiments, the methods and systems described herein provide mechanisms for encouraging purchase of media items from the second source. Previously played lists and audio and visual cues to alert the user that a media item from the second source is being played can be used. Further, discounts on the purchase price or an increased number of media items from a second source can be used to incentivize a user to purchase shared media items while they are being played (or shortly thereafter).

Finally, mechanisms to allow a user to purchase the media items are provided. The system can provide a point of purchase from icons representing the media item or from the playlist directly. Alternatively, a user can be directed to the online store to complete the purchase.

DESCRIPTION

In preferred embodiments, the present technology is applied to creating and playing playlists of media items derived from multiple sources. In some embodiments, one of the sources is a user's personal media collection and one of the sources is an online music store.

A playlist can be created, or a previously crafted playlist can be loaded into a media player. In some embodiments the playlist can contain media items that cannot be found from a primary media source, for example a computer or media player's local disk. In such embodiments, the media player can request and retrieve the missing media items from an online store to complete the playlist. For example, a user might load a playlist created by a friend or online store. The media player can begin to playback the media items in the playlist as it would in conventional operation. However, when the media player encounters a media item that is not in the user's local library, it can retrieve that media item from an online store.

In some embodiments, the playlist can include media items that can all be located from a primary media source, which is typically a storage drive associated with the media player. As the media player plays back the media items in the playlist, the media player can request and retrieve additional media items from an online source and include these media items in the playlist.

In some embodiments a user may play content from the user's library, and songs from a secondary source (such as an online media store, a remote user's library, etc.). A slider or other user interface control or programmed restriction can be provided to allow the user to retrieve a percentage of music in their own library to play compared to that of music from the secondary source.

As an example, the user may create a playlist thereby identifying a list of correlated songs. If the primary source/secondary source percentage threshold is set at 50%, then approximately 50% of the songs would play from the playlist and 50% from the secondary source. The secondary source can utilize a seed song(s) from within the playlist to identify related songs to play back. The song from the secondary source can be streamed to the client for playback. The client may keep track of songs such that the secondary source does not playback duplicate songs, or the client, in addition to the initial seed song, may submit the entire playlist to the secondary source.

In some embodiments, the number of media items drawn from the secondary source can be modified by user selection. In some embodiments, the number of media items drawn from the secondary source is controlled by an algorithm that can adjust the number of songs played back from the secondary source according to factors such as royalty cost of each item played, number of purchases a user has made from the online store, duration of playlist and other factors.

Figure 1:
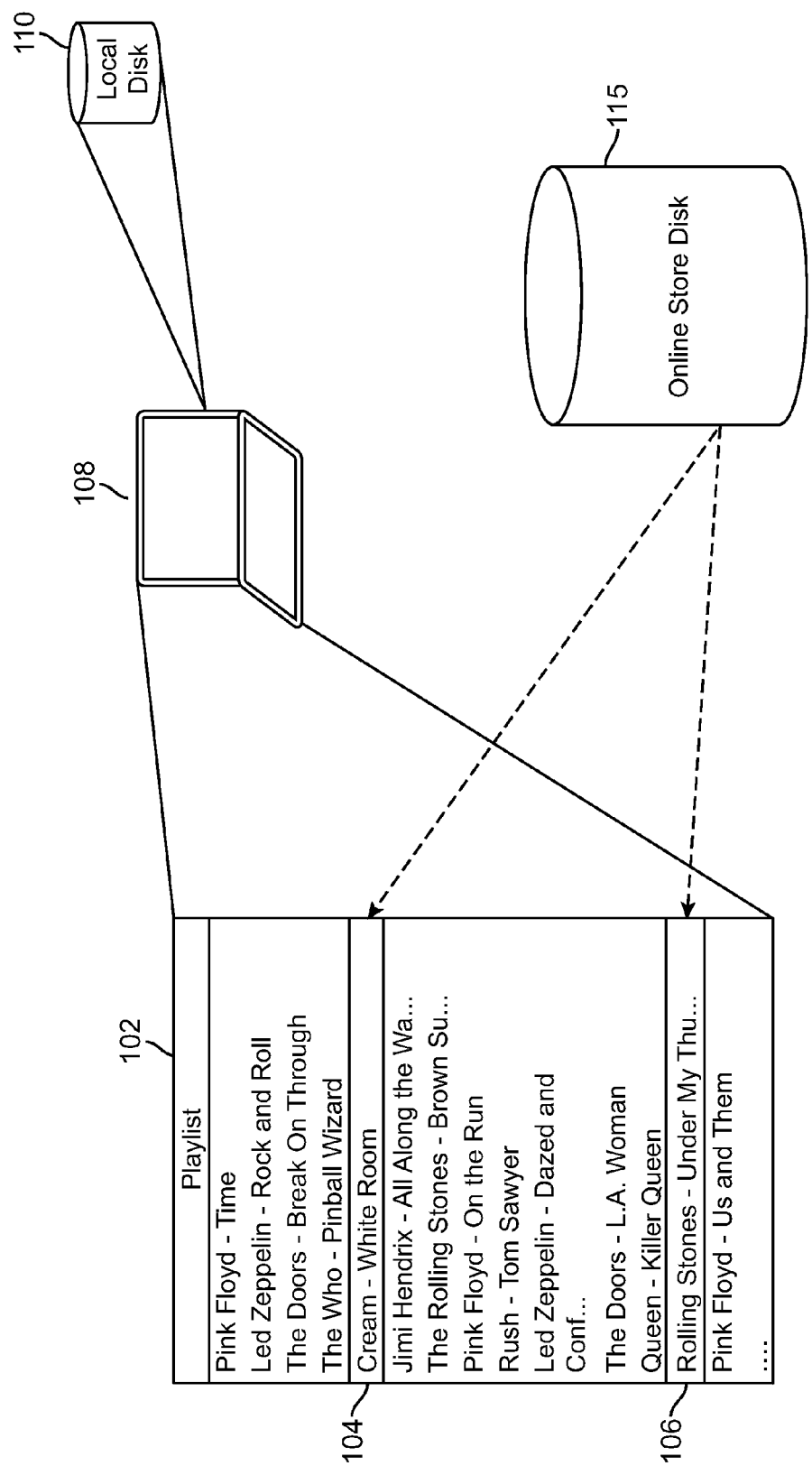
FIG. 1 illustrates an exemplary system embodiment.

FIG. 1 illustrates an exemplary system embodiment. Client device 108 is illustrated having a playlist 102 loaded into its media player (for example ITUNES by Apple Inc., of Cupertino, Calif.). The playlist 102 comprises media items, in this example music, which is stored from a first source, the local disk 110 of the client device 108 and music 104, 108, retrieved from a second source, the online store disk 115. It should be appreciated that while a local disk is illustrated as the first source, the first source of media items can be any source which is associated with the media player, or any source from which the media player typically retrieves media items for playback. In specifically contemplated embodiments, this source includes local disks, external disks, such as flash drives and external hard drives, networked disks such as other storage devices on a local area network, and disks associated with cloud computing where a user's media files may be stored on a remote server for access anywhere. In each of these embodiments, the source should contain primarily media items to which the user has some claim of title, whether acquired properly in respect to copyright laws or otherwise. The playlist 102 also comprises media items from online store 115 (for example, ITUNES STORE by Apple Inc., of Cupertino, Calif.).

The second source can contain media items that the user does not have any independent right to perform. For example, an online store contains media items that the user owns, and media items that the user does not own. In the embodiments described herein, the second source can supply media items that the user does not own for inclusion in a playlist. Media items 104 and 106 represent songs that the user does not own, which are supplied from the second source. While the user does not have any right itself to perform the media items from the second source, the user can acquire or bootstrap rights possessed by the online store to temporarily provide the user with the right to perform the media item. The right to perform, as used herein, refers to any right to playback the media item and as the term is otherwise known within the copyright laws.

Figure 2:
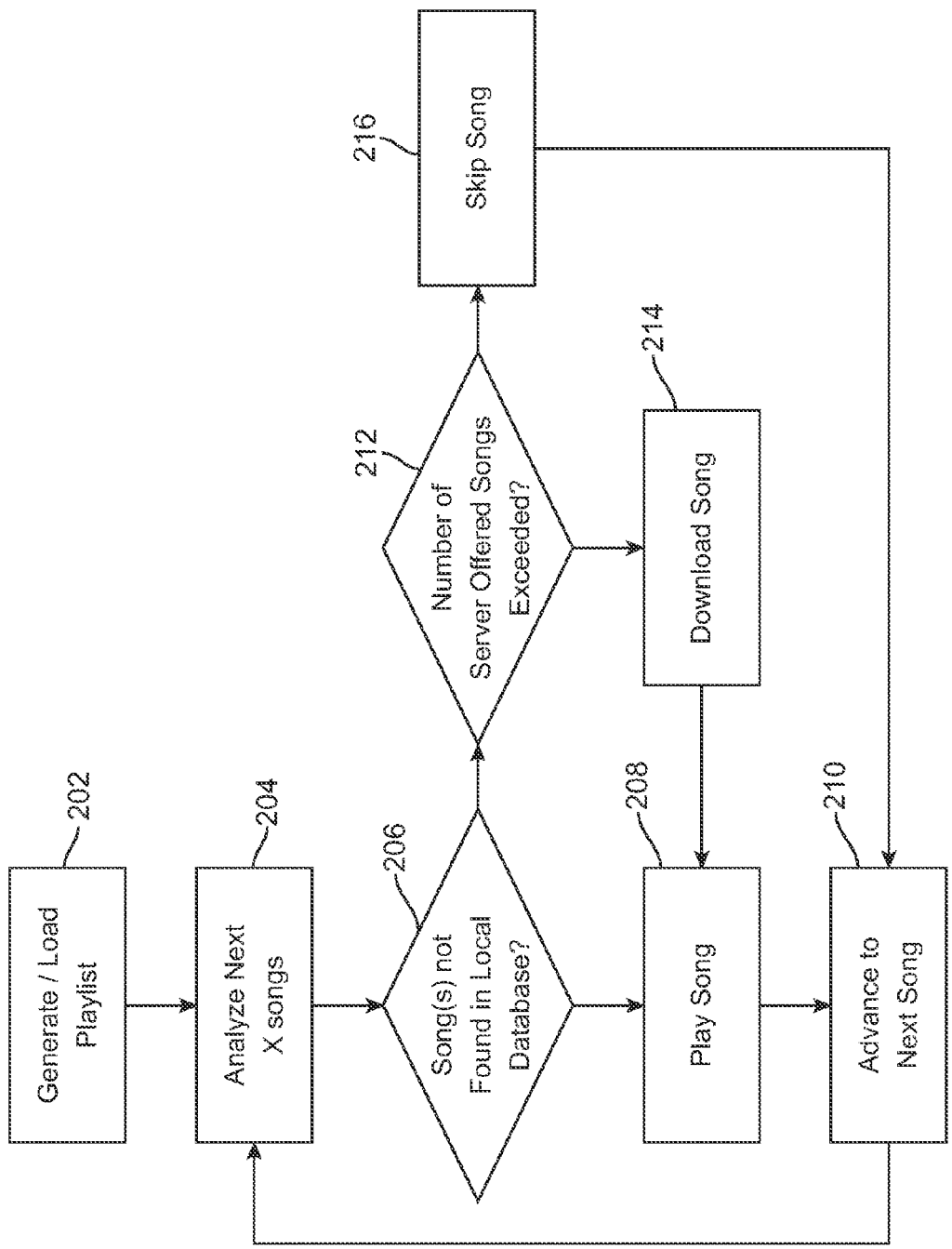
FIG. 2 illustrates an exemplary method embodiment for loading and playing a playlist comprising mixed sources of media items.

FIG. 2 illustrates an exemplary method embodiment wherein a client computer loads or generates a playlist (202). In some embodiments, the playlist can be substantially generated by a user or the client device, or previously created playlists can be loaded into the client device's memory. In embodiments wherein a user generates a playlist, the user can select media items from their own library, and allow the media player to add additional media items from the server consistent with the embodiments described herein. In embodiments where the client device generates the playlist, or the playlist is one that has been downloaded from another source, such as the online store or a friend, media items within the playlist will, in some instances, be stored on the client device's local memory, and other items will need to be retrieved from the server.

Since the playlist contains some media items that are not stored locally, the media player will need to retrieve these media items from the online store. The media player can read ahead in the playlist (204) a variable number (represented by "x") of media items where "x" is an integer greater than 0. In some embodiments, the media player can read ahead only a few media items, while in some embodiments the media player can read the entire playlist. Reading ahead allows the media player to learn of media items that are not in the local database and to download the media item from the online store before it is time to play to the media item.

In some embodiments, the media item can be downloaded when the playlist is created. In these embodiments, a playlist can be taken off-line, but still gain the benefit of including media items from the online store. These embodiments can be especially useful when a playlist is created by a media player on a client computer, and then transferred to a portable media-playing device such as the iPod® by Apple Inc., Cupertino, Calif. In this way, downloaded songs can be treated as rentals having a limited life.

However, in some embodiments the media item is downloaded only shortly before it is ready to play. This embodiment reduces wasted resources by limiting the number of media items that are downloaded that are not played. For example, a media item that is not scheduled to be played until an hour into the playlist might never be played. By only downloading media items a short time before they are scheduled to play, the likelihood that resources will be wasted by transmitting a media item that will not be played is reduced.

As illustrated in FIG. 2, the media player reads ahead in the playlist. If any of these media items are not able to be located (206) in the local storage, the media player will request the media item from the server if a number of server offered media items has not been exceeded (212). The number of server offered media items can, in some embodiments, be controlled by the client device and in other embodiments be controlled by the server. Still, in some embodiments a combination of client and server control of the number of media items to come from the remote source can be used.

In embodiments wherein the number of media items to be offered or received by the server is under the client device's control, the media player can be configured to present a slider selection switch or other input mechanism to allow the user to select a percentage of music items to come from the remote source. Putting control of the amount of media items coming from a remote source in the user's control allows a user to use the media player as a music discovery tool by choosing to discover a lot of music or only a little.

In embodiments wherein the number of media items to be offered by the server is under the control of the server, the server can account for the royalties that need to be paid for each media item that is played from the server and balance that cost with a variety of factors. Some of these factors include, whether the user is buying any of the media items that are coming from the second source and duration of play time elapsed, among others. If a user is purchasing some of the media items that are supplied by the online store, the server can be configured to allow additional media items to be sent to the user because the purchase of the media items can offset the cost of royalty payment for playing the media item. Alternatively, if a certain amount of time has elapsed, it can be determined that the music is playing in the background and therefore does not have the user's primary attention. It can be concluded that the user is less likely to purchase any media items in this period and so the number of media items available to the user is reduced.

In some embodiments the server can determine a number of media items to share subject to any limits set by the user. Thus if the server is configured to share three media items an hour with the user, but the user has set her music discovery slider to only allow 1 media item an hour, the user will only hear one server provided media item an hour. If the user adjusts the music discovery slider or threshold to allow more media items, the user still will not hear more than three media items an hour since the server has also imposed a limit.

Thus, the media player determines if the number of media items to be provided from the server has been exceeded (212). The media player may keep track of this limit whether user provided or provided by the server or the media player can query the server if the limit has been exceeded.

If the limit has been exceeded, the media item is skipped (216) and the playlist advances to the next media item (210). If, however, the limit has not been exceeded, the media item is downloaded (214) and the media item will play (208) when its position in the playlist has been reached. Upon completion of playing the media item, the media player proceeds (210) to the next media item and the process repeats by analyzing (204) some number of media items ahead in the playlist for media items not in the local storage (206).

Figure 3:
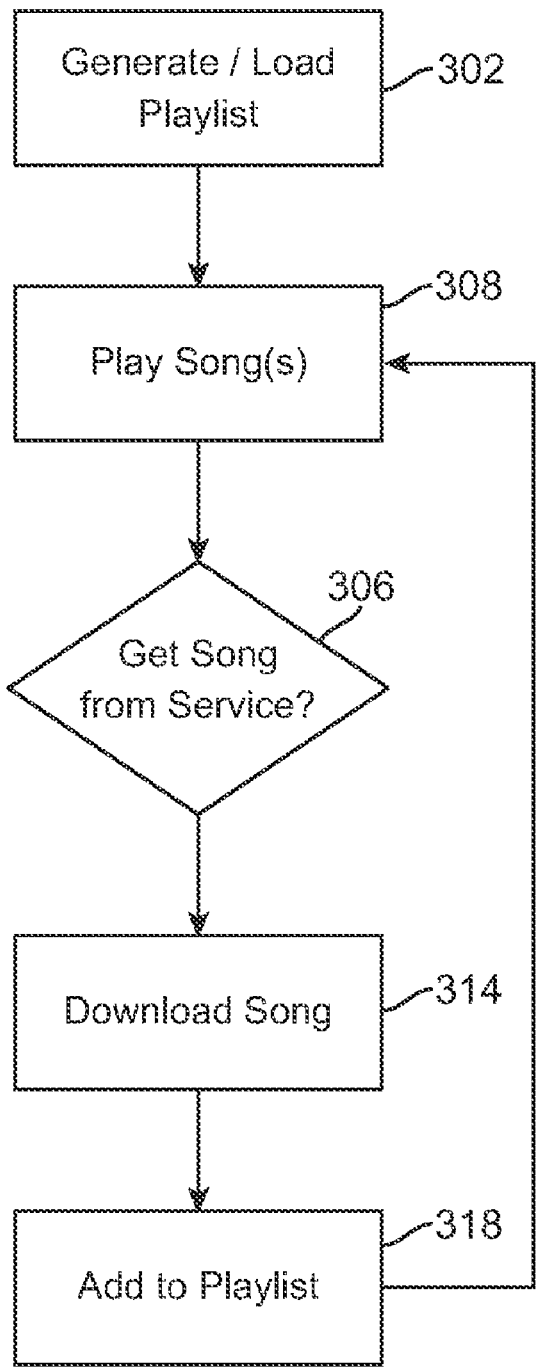
FIG. 3 illustrates an exemplary method embodiment for loading and playing a playlist comprising mixed sources of media items.

FIG. 3 illustrates an embodiment wherein the media player occasionally inserts a media item from an online store. In this embodiment, the media player can generate a playlist or load a previously created playlist (302). In this embodiment, the media items in the playlist can all be found on a local disk. As the media player plays (308) the items in the playlist, the media player can decide whether to get an additional media item from the online store (306).

In some embodiments, the media player determines whether a media item should be downloaded from the service according to a trigger that is activated at random intervals. In some embodiments, the trigger is spaced at regular intervals that can be determined based on a user set preference or a limit set by the server or a combination of these methods, each of which is explained above. In some embodiments, the trigger can be inserted into the playlist as a placeholder.

Once the trigger has been set, the media player determines whether or not to download a media item from the online store. The determination can be made based on user preferences or a server determination. In some embodiments, the server determination is made when a new media item is requested from the server. In some embodiments, the server predetermines a limit to the number of media items a user can receive from the server in advance, and the media player can request a media item from the server or not based on the terms of the predetermined limit.

If the determination (306) results in a media item to be downloaded, the media player requests and downloads (314) a media item from the online store and adds the media item to the playlist (318) to be played when its position in the playlist is reached.

The online store determines which media item will be sent to the client. Using one or more media items within the playlist as a seed, the online store can recommend additional media items that are similar or go well with the seed media item(s). The media item should not be one that is present in the local media library.

While similarity relationships can take many forms, one preferred type of similarity relationship is derived from an analysis of many individual user's media libraries. Typically each user chooses to share identifying information about each item in their music library with an online service (online music store for example) regardless of where the media item was downloaded from, purchased, or loaded onto the device. The service analyzes each user's media library and identifies pairs of media items that occur in multiple libraries. The media items that co-occur in the greatest number of media libraries can be deemed to be most similar. However, the recommendation of other media items based on the relative similarity between the seed item(s) and a recommended item is not limited to this type of similarity relationship; any method of determining that two are more items are similar can be used to recommend items for inclusion in the playlist.

In some embodiments, the server keeps a record of all of the media items stored in the client's local media library. In some embodiments, the server's record of the media items stored in the client's local library does not discriminate among the media items based on their source or point of purchase. Accordingly, even media items that were not purchased from the online store are known to the server. By consulting this data, the server can avoid sending media items to the client that the client has already stored locally.

In order for the server to keep an accurate record of media items stored in the client computer's library, it must be able to identify media items stored on the client computer and correlate those media items to the media items stored on the server. If the media item was originally purchased from the online store, the media item can have a store identifier associated with the item. The identifier can be used to identify the media item to the online store. However, for media items acquired from other sources (presumably the item will not have the store's identifier associated with it), the online store must match the media item with the same items in the store. This can be accomplished by either analyzing the metadata associated with the media items or by taking an audio fingerprint of the media item and using a music-identifying database to identify the media items to the server.

As the server continues to suggest new media items for the user to experience, it can also be beneficial to provide a history of previously played items. Users can refer to the list and decide to purchase the media item. The list can either include a running list of all media items played, regardless of source, or it can include only media items from a non-local source so that the user can easily identify media items they do not own.

In some embodiments, a chime or other method of providing an auditory signal to the user is played whenever a media item from a foreign source is played. Additionally, the media player can graphically indicate items that are from a non-local source. Both methods can alert a user that a media item from a non-local source is being played and in turn attract the listener's attention to the media item for consideration for purchase.

In some embodiments the user can tag a media item played by the system for future purchase or consideration for purchase. In some embodiments the system can provide incentives to purchase the item while it is playing. For example, a discount can be provided to entice the user to purchase the media item during its playback. Similarly, additional free samples can be awarded to a user for prompt purchase.

As described above, a number of embodiments are contemplated for deciding upon the best allotment of non-local music items to be shared. In some embodiments, a default allotment is provided to every user. In other embodiments, a subscription-based model can be accompanied by unlimited media item sharing.

In some embodiments, a default allotment can be adjusted based on user actions and profit margins. As an example, the system can allot 50 media items per month to all users, for which a royalty to share these media items will be paid. Accordingly, the number of media items shared with a specific user can be adjusted based on the cost or profit to the service. Users that buy media items that are shared with them can be awarded a greater allotment of shared media items. In essence, the shared media items can be viewed as investments in future sales. However, users that do not buy media items that are shared with them can have their allotment reduced so as to reduce the size of the failed investment in sharing media items with those users.

Similarly, the concentration of shared media items in a playlist can taper as the playlist continues. If listeners are less likely to purchase shared items the later they play in the list, the service can provide a higher concentration of shared media earlier in the playlist and a lower concentration later in the playlist in order to give the media items the greatest chance of being purchased.

In some embodiments, the client computer or its user can veto suggested tracks. When the server queues a track in the playlist, a user can choose to veto the suggested track and cause it not to play. Alternatively, the client computer can have a block list of artists or tracks that it can use to identify and veto tracks that should not be played. When a track is vetoed by either the client device or the user, the server can suggest a new media item or skip making a recommendation at that position in the playlist.

Figure 4:
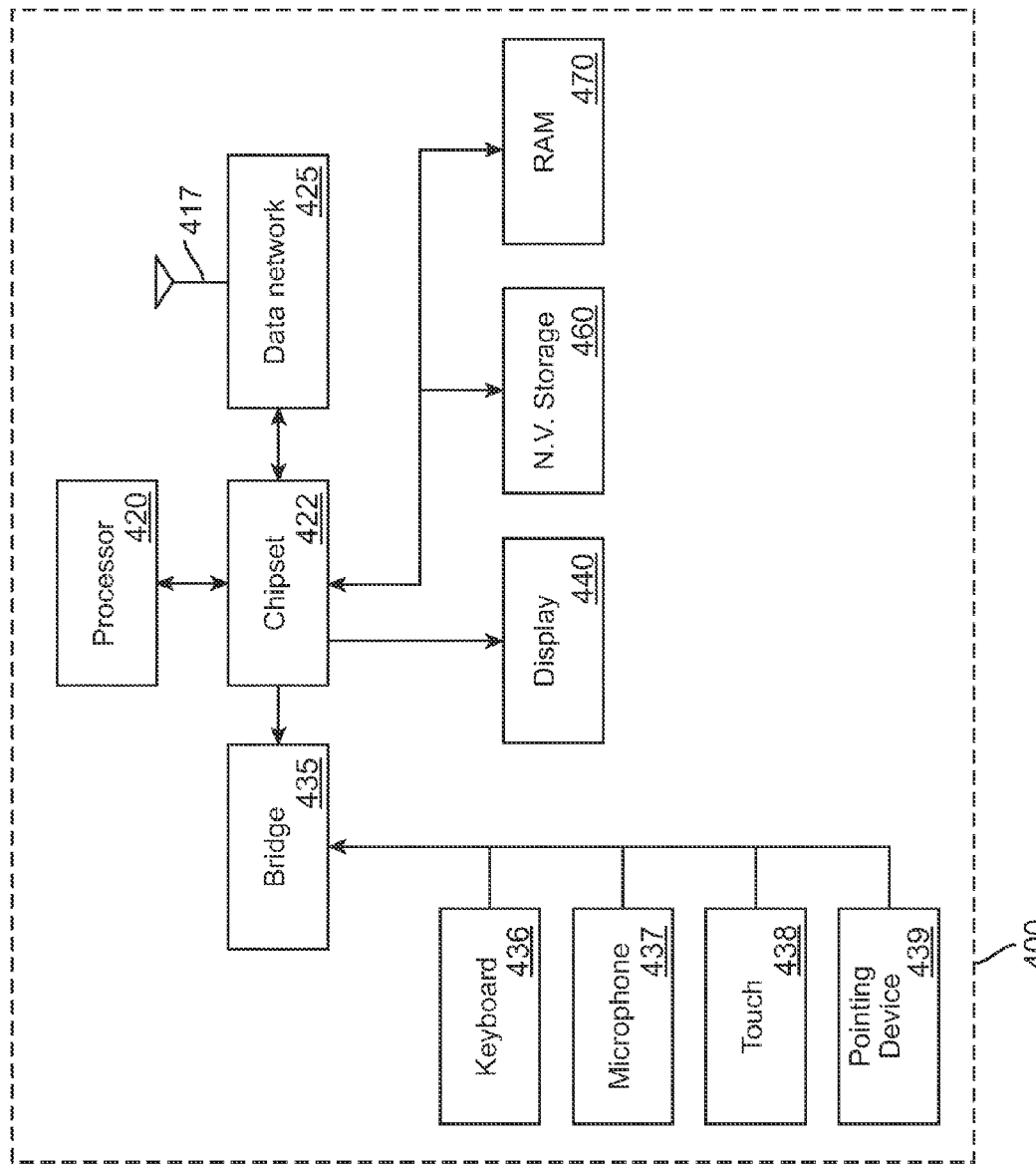
FIG. 4 illustrates and example system embodiment.

FIG. 4 illustrates a computer system 400 used in executing the described method and generating and displaying the GUI. Computer system 400 is an example of computer hardware, software, and firmware that can be used to implement the present disclosures. System 400 includes a processor 420, representative of any number of physically and/or logically distinct resources capable of executing software, firmware, and hardware configured to perform identified computations. Processor 420 communicates with a chipset 422 that can control input to and output from processor 420. In this example, chipset 422 outputs information to display 440, and can read and write information to non-volatile storage 460, which can include magnetic media, and solid state media, for example. Chipset 422 also can read data from and write data to RAM 470. A bridge 435 for interfacing with a variety of user interface components can be provided for interfacing with chipset 422. Such user interface components can include a keyboard 436, a microphone 437, touch detection and processing circuitry 438, a pointing device, such as a mouse 439, and so on. In general, inputs to system 400 can come from any of a variety of sources, machine generated and/or human generated.

Chipset 422 also can interface with one or more data network interfaces 425 that can have different physical interfaces 417. Such data network interfaces can include interfaces for wired and wireless local area networks, for broadband wireless networks, as well as personal area networks. Some applications of the methods described herein include communication with an online store or client device, which can be accomplished using data network interfaces 425.

While throughout this description various embodiments have been described as pertaining to media items or songs, it should be appreciated that no embodiment herein should be specifically limited to one type of media item. A media item can include for example music, audio tracks, video, audio-video, movies, applications, and data files. Reference to one or more of these media items should be viewed as interchangeable amongst each of the specific forms of media items.

Methods according to the above-described examples can be implemented using computer-executable instructions that are stored or otherwise available from computer readable media. Such instructions comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality also can be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:
identifying, by a processor, a collection of media items in a playlist that an electronic device does not have an independent right to perform;
adjusting, by the processor, a limit of temporary authorizations to perform the media items that the electronic device otherwise does not have an independent right to perform, wherein the limit is temporarily decreased upon detection that an application configured to playback the playlist has not received any user input for a predetermined period of time; and
granting temporary authorizations to perform the media items that the electronic device otherwise does not have an independent right to perform until the limit is reached.

2. The method of claim 1, wherein detection of a purchase of a media item from the collection of media items that the electronic device does not have an independent right to perform increases the limit.

3. The method of claim 1, wherein the limit is restored upon detection that a user input is received.

4. The method of claim 1, wherein receipt of a request to increase the limit of temporary authorizations increases the limit.

5. The method of claim 1, wherein the limit is temporarily decreased upon detection that a determined cap of royalties accrued has been exceeded.

6. The method of claim 1, wherein the limit of temporary authorizations is measured in media items per unit of time.

7. A system comprising:
a processor configured to identify a collection of-media items in a playlist that an electronic device does not have an independent right to perform; to adjust a limit of temporary authorizations to perform the media items that the electronic device otherwise does not have an independent right to perform, wherein the limit is temporarily decreased upon detection that an application configured to playback the playlist has not received any user input for a predetermined period of time; and
a communications interface configured to transmit to send temporary authorizations to perform the media items that the electronic device otherwise does not have an independent right to perform until the limit is reached.

8. The system of claim 7, wherein detection of a purchase of a media item from the collection of media items that the electronic device does not have an independent right to perform increases the limit.

9. The system of claim 7, wherein the limit is restored upon detection that a user input is received.

10. The system of claim 7, wherein receipt of a request to increase the limit of temporary authorizations increases the limit.

11. The system of claim 7, wherein limit is temporarily decreased upon detection that a determined cap of royalties accrued has been exceeded.

12. The system of claim 7, wherein the limit of temporary authorizations is measured in media items per unit of time.

13. A non-transitory computer readable medium having computer-readable instructions stored thereon effective for causing a computer to perform a method comprising:
identifying, by a processor, a collection of media items in a playlist that an electronic device does not have an independent right to perform;
adjusting, by the processor, a limit of temporary authorizations to perform the media items that the electronic device otherwise does not have an independent right to perform, wherein the limit is temporarily decreased upon detection that an application configured to playback the playlist has not received any user input for a predetermined period of time; and
granting temporary authorizations to perform the media items that the electronic device otherwise does not have an independent right to perform until the limit is reached.

14. The non-transitory computer readable medium of claim 13, wherein detection of a purchase of a media item from the collection of media items that the electronic device does not have an independent right to perform increases the limit.

15. The non-transitory computer readable medium of claim 13, wherein the limit is restored upon detection that a user input is received.

16. The non-transitory computer readable medium of claim 13, wherein a receipt of a request to increase the limit of temporary authorizations increases the limit.

17. The non-transitory computer readable medium of claim 13, wherein the limit is temporarily decreased upon detection that a determined cap of royalties accrued has been exceeded.

18. The non-transitory computer readable medium of claim 13, wherein the limit of temporary authorizations is measured in media items per unit of time.

* * * * *

UNITED STATES PATENT AND TRADEMARK OFFICE
CERTIFICATE OF CORRECTION

PATENT NO. : 8,341,039 B2
APPLICATION NO. : 13/249074
DATED : December 25, 2012
INVENTOR(S) : Bachman et al.

Page 1 of 1

It is certified that error appears in the above-identified patent and that said Letters Patent is hereby corrected as shown below:

In the Claims

Column 9, line 33, in Claim 4, after "wherein", insert --a--, therefor

Column 9, line 42, in Claim 7, delete "of-media" and insert --of media--, therefor Column 10, line 9, in Claim 10, after "wherein", insert --a--, therefor Column 10, line 12, in Claim 10, after "wherein", insert --the--, therefor Signed and Sealed this
Seventh Day of January, 2014

Margaret A. Focarino
*Commissioner for Patents of the United States Patent and Trademark Office*